March 23, 1965 G. E. SWANSON 3,174,784
FASTENING DEVICE
Filed Oct. 22, 1962 2 Sheets-Sheet 1
FIG. 1
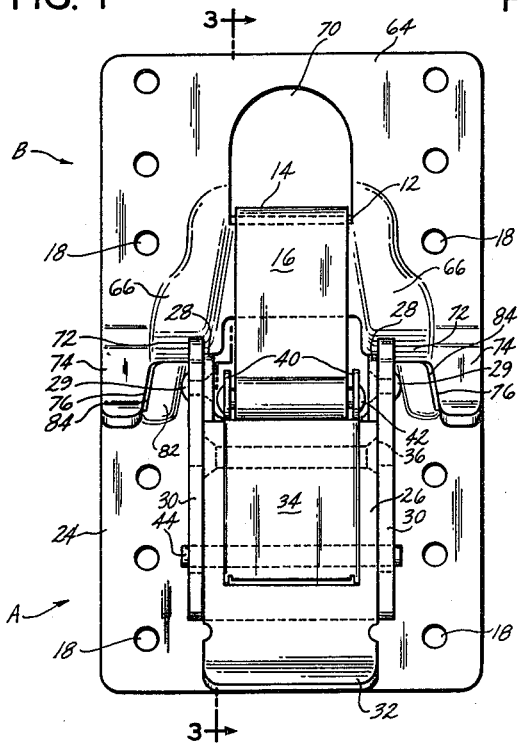
FIG. 2
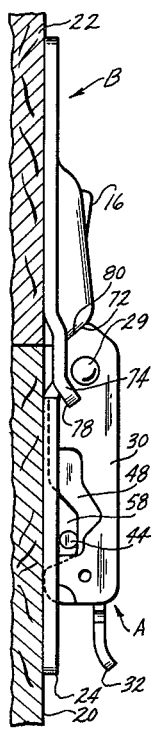
FIG. 5
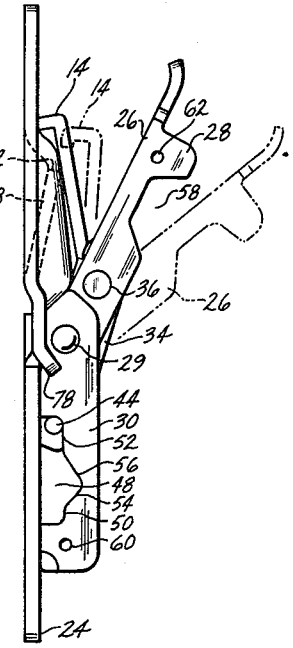
FIG. 3 FIG. 4
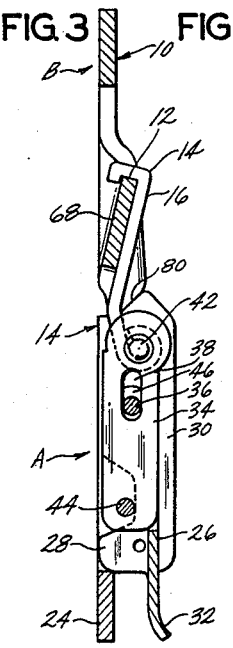
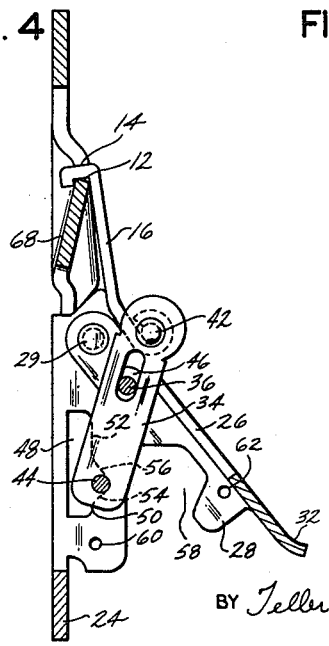
FIG. 6
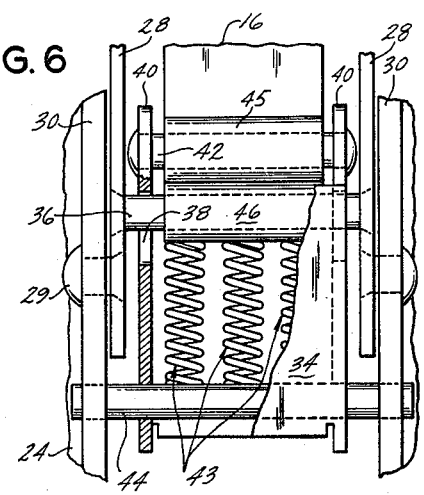
INVENTOR.
GUNNAR E. SWANSON
BY Teller, McCormick, Paulding & Huber
ATTORNEYS

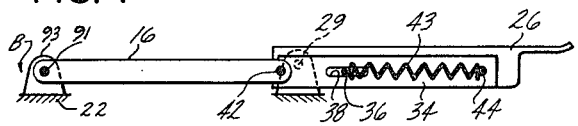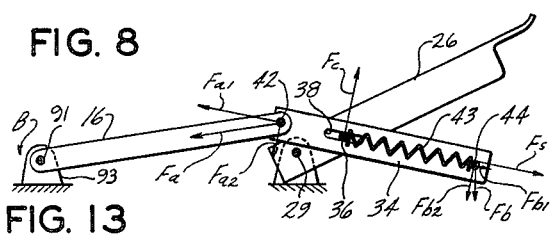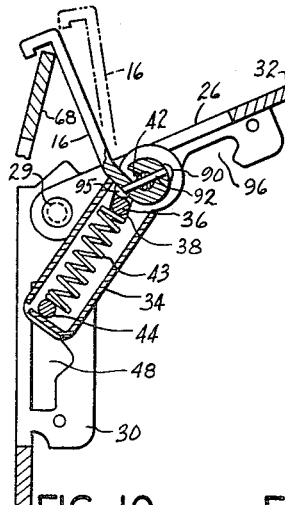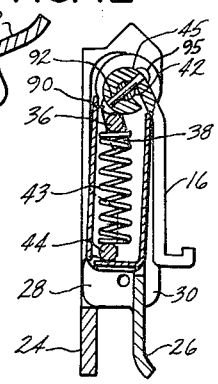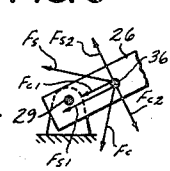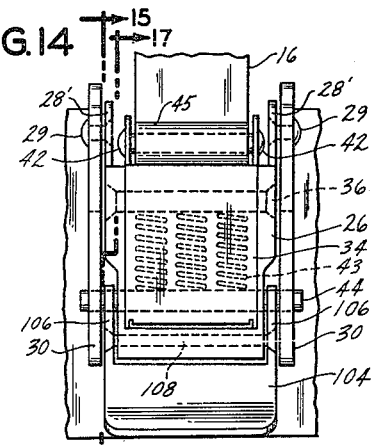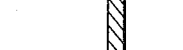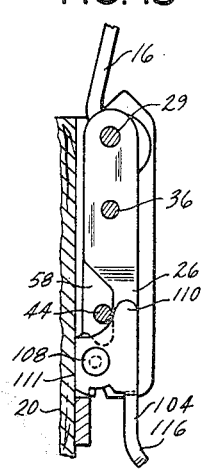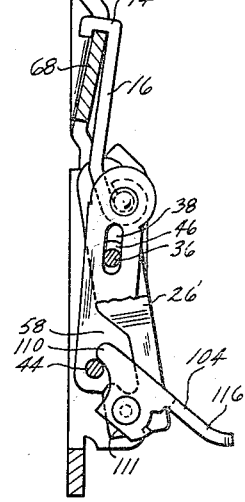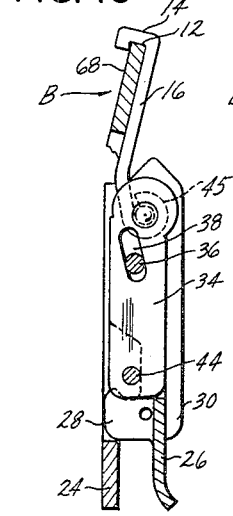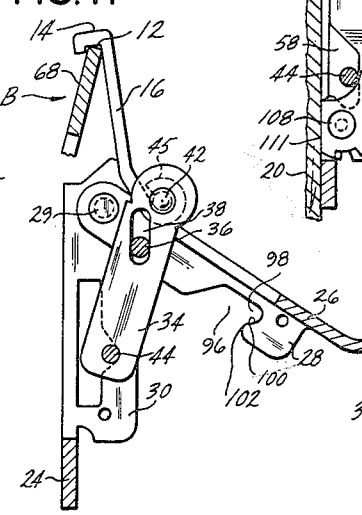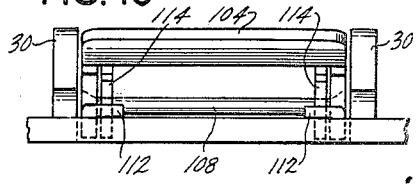

United States Patent Office 3,174,784
Patented Mar. 23, 1965

1

3,174,784
FASTENING DEVICE
Gunnar E. Swanson, 409 Ridge Road, Middletown, Conn.
Filed Oct. 22, 1962, Ser. No. 231,911
31 Claims. (Cl. 292—113)

This invention relates to a fastening device for releasably securing together two panels or the like such as found, for example, on a packing case or the like having a body and having a cover upwardly separable from said body. A strike is provided which is adapted to be fixedly attached to said cover, and a catch unit is provided which is adapted to be fixedly attached to said body below the strike. The catch unit includes a base member and an operating lever movable about an axis fixed relative to said base and a link means pivoted to said lever at a movable axis, one part of said link means being connectible with said strike. The relationship of these parts is such that said link means when so connected and said lever when in a forward or open position constitute toggle links movable respectively about the pivotal connection with the strike and about said fixed lever axis so that said movable link axis has a draw bolt or toggle action with respect to these points upon movement of the lever to an extreme rearward or closed position.

One object of the invention is to provide a fastening device of the stated type wherein the composite parts are so arranged that the operating lever is mechanically and frictionally controlled relative to the spring release force when the lever is moved toward its open or release position so that shock release and rebound normally prevalent in spring loaded catches are prevented.

Another object of the invention is to provide a fastening device having the customary rapid release of lever catches and offering a substantial spring closing force, the device also having a relatively easy manual release and features securing against accidental or shock release.

Another object of the invention is to provide a fastening device of the stated type having a composite link means so constructed and arranged that when not connected with the strike the angular relation between the individual links is frictionally maintained or held by a cam protrusion to prevent inadvertent reconnection of the link means with the strike.

Another object of the invention is to provide a fastening device of the stated type having a spring means associated with the link means for exerting a resilient downward pull on the strike and which device exhibits no sudden opening or jumping action or no severe spring release force, characteristic of other spring loaded catches, as the operating lever is moved from its rearward or closed position toward its forward or open position.

Another object of the invention is to provide a fastening device of the stated type having cooperating guide means on the strike and on the catch unit such that these elements are guided in two directions, as the cover or other strike bearing part is brought into close relationship with the body or other part bearing the catch unit, to properly align the strike with the catch unit, said guide means also serving to hold these elements in alignment after the catch has been closed to prevent movement in any direction of the cover relative to the base.

A still further object of this invention is to provide a fastening device of the foregoing character including a control lever on the operating lever for moving the operating lever between its open and closed positions, said control lever when said operating lever is in its closed position being movable from an inactive position close to the body to an active position further from the body so as to be more conveniently manipulated by a user, said control lever further being releasably held in its inactive

2 position under the action of the same spring means as used to exert a resilient pull on said strike.

The drawings show several embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a front elevational view of a fastening device embodying the invention, the device being shown in a closed condition.

FIG. 2 is a side view of the device shown in FIG. 1, this view also additionally showing the device as mounted on two separable panels.

FIG. 3 is a vertical sectional view taken along the line 3—3 of FIG. 1.

FIG. 4 is a view similar to FIG. 3, but with the operating lever being shown moved to a position between its fully closed and fully open positions.

FIG. 5 is a view similar to FIG. 2, but with the operating lever being shown moved to other positions, the full lines showing the positions occupied by the various parts of the device when the operating lever is moved to its forward or fully open position and the broken lines showing the positions occupied by the same parts after the operating lever is returned some distance toward its rearward or closed position.

FIG. 6 is an enlarged and fragmentary view partly in elevation and partly in section showing the construction of the spring cartridge of the device of FIG. 1.

FIG. 7 is a schematic illustration of the fastening device of FIG. 1 showing the relative positions of the various pivot axes when the operating lever is in its closed position.

FIG. 8 is a schematic illustration similar to FIG. 7 but showing the positions occupied by the various parts and the forces acting on the spring cartridge when the operating lever is moved partially toward its open position.

FIG. 9 is a fragmentary schematic illustration of the operating lever in the FIG. 8 position and shows the forces acting thereon.

FIG. 10 is a vertical sectional view generally similar to FIG. 3 but showing a fastening device comprising an alternate embodiment of the invention.

FIG. 11 is a vertical sectional view generally similar to FIG. 4 but showing the construction of FIG. 10.

FIG. 12 is a vertical sectional view taken on a plane passing through the spring cartridge of the fastening device of FIG. 10 and showing the hook member folded to an inactive position with the operating lever in its closed position.

FIG. 13 is a vertical sectional view similar to FIG. 12 but showing the operating lever moved to an open position.

FIG. 14 is a partial front elevational view of a fastening device generally similar to that of FIG. 1 but comprising still another embodiment of the invention, the device being shown in its closed condition.

FIG. 15 is a vertical sectional view taken on the line 15—15 of FIG. 14.

FIG. 16 is a bottom or rear end view of the fastening device of FIG. 14.

FIG. 17 is a vertical sectional view taken on the line 17—17 of FIG. 14 with the operating lever being shown displaced somewhat from the fully closed position of FIGS. 13 and 14.

A fastening device embodying the present invention is adapted for releasably joining two separate panels or parts such as found, for example, in a packing case having a body and a cover upwardly separable from said body. Referring to the drawings, and first more particularly to FIGS. 1 to 6 thereof, such a device is shown to include a catch unit, indicated generally at A, adapted for use in cooperation with strike B.

The strike B includes a means defining a generally upwardly or forwardly facing bearing surface for cooperation with means on the catch unit A defining a generally downwardly or rearwardly facing bearing surface. The bearing surface of the strike comprises a generally upwardly facing straight edge 12 and the bearing surface of the catch unit is defined by a U-shaped hook 14 on the upper or free end of a member 16. Both the stirke B and the catch unit A are adapted to be fixedly secured to different ones of two separable panels or the like, such as the cover and body of a packing case, and for this purpose each may be provided with a plurality of openings 18, 18 for receiving rivets or other similar fastening elements. As shown in FIG. 2, the catch unit A and the strike B are adapted to being mounted on flat surfaces of two separable panels 20 and 22, respectively, which flat surfaces are in a common plane. This type of mounting is however not essential and the catch unit and strike may be modified for mounting on other different surfaces without departing from at least the broader aspects of the invention.

The catch unit A of the fastening device includes a base 24 adapted to rest flatly against the panel 20 and which base includes the openings 18, 18 for use in fixedly attaching the same to the panel. The catch unit also includes an operating lever 26 connected with the base 24 for pivotal movement about a horizontal transverse axis fixed relative to said base. The lever 26 is shown as having two parallel side flanges 28, 28 which extend generally parallel to the base when the lever is in its closed position as shown in FIGS. 1, 2 and 3. The pivotal connection between the base and operating lever is provided by two transversely aligned and horizontally extending pivot pins 29, 29 which pass through apertures in the side flanges 28, 28 and through corresponding apertures in vertically extending and transversely spaced flanges 30, 30 which are bent up from the base 24. In the embodiment shown in FIGS. 1 to 6 the lever 26 has an extension 32 which serves as a finger piece for moving the lever and connected parts relative to the base. From the latter figures it will also be noted that the base flanges 30, 30 are of substantially the same length as the side flanges 28, 28 of the operating lever and that when the operating lever is in its closed position the side flanges 28, 28 are located closely adjacent to and between the flanges 30, 30.

A composite link means is pivotally connected with the operating lever 26 and is engageable with the strike A. In the illustrated case and composite link means includes a generally vertical first link 34 connected with the lever 26 at a first link axis movable relative to the base 24 and also includes the hook member 16 which constitutes a generally vertical second link pivotally connected at its lower end to the upper end of the first link 34 for movement about a second link axis movable relative to the base, said second link or hook member 16 having at its upper end the hook portion 14 which is engageable with the strike. The first movable link axis is defined by a lever member which extends transversely between the side flanges 28, 28 of the operating lever and which passes loosely through transversely aligned elongated slots 38, 38 in the side walls 40, 40 of the link 34. In the device illustrated in FIGS. 1 to 6 the lever member constitutes a pivot pin secured at opposite ends to the side flanges 28, 28 and the slots 38, 38 are elongated in the direction extending generally longitudinally of the link 34 and are so shaped as to provide parallel side walls which are spaced apart by a distance equal to approximately the diameter of the pin 36. This shape of slot is however not essential and the shape may be varied as brought out in more detail hereinafter to vary the operating characteristics of the device. The second movable link axis is defined by another transversely extending pivot pin 42 which is secured to the side walls 40, 40 of the link 34 at a point located upwardly or forwardly of slots 38, 38 and which passes loosely through a transverse opening in the lower end of the hook member 16. The opening in the hook member may be formed in various different ways and in the present case is illustrated as being formed by bending the material of the hook member into an eye 45. In any event, it is important to one aspect of the invention that the lower end of the hook member have a rounded external surface, generally concentric with the axis of the pin 42, such as provided by the eye 45.

A spring means is included in said composite link means and when the operating lever is moved from its open to its closed position said spring means serves to resist any increase in the distance between the first link axis and the hook portion 14 of the second link 16. In the illustrated embodiment, the spring means is included in the first link 34, which link is in the form of a hollow rectangular spring cartridge located between the operating lever side flanges 28, 28. The said spring means is located within the hollow link 34 and as shown comprises three helical compression springs 43, 43 which act between a transversely extending pin 44 carried by the lower end of the link and a cylindrical sleeve 46 received on the pivot pin 36. The latter pivot pin 36 is movable with respect to the first link or cartridge 34 by reason of the slots 38, 38 in the side walls 40, 40 thereof. As mentioned, the pivot pin 36 extends through said slots and the springs 43, 43 are of such a size and shape as to be held in a state of compression throughout the entire range of movement of the cartridge 34 relative to the pin 36. As a result of this the cartridge 34 is biased rearwardly or downwardly relative to the pin 36 with the springs acting to resist movement of the pin away from the upper ends of the slots 38, 38.

The pin 44 carried by the lower or rear end of the spring cartridge 34 projects transversely from either side of the cartridge with each projecting portion being received in a slot 48 formed in the associated base flange 30. By means of this pin and slot combination the rear end of the spring cartridge is held close to the base 24 and the movement of the pin 44 relative to the base is restricted to the area defined by the slots. The shapes of the slots are relatively important to the operation of the device as explained hereinafter but may be modified somewhat from the exact shape shown. Referring to FIGS. 2, 4 and 5, the outer or right hand wall of each slot is the most important wall and in the illustrated case this wall is shaped to include a relatively straight lower or rear portion 50, adjacent which the pin 36 is located when the operating lever is in its closed position, and another relatively straight upper or forward portion 52 adjacent which the pin 36 is located when the operating lever is in the open position. Between the two straight wall portions 50 and 52 is an inclined portion 54 which faces generally forwardly and another inclined portion 56 which faces generally rearwardly, the pin 36 being moved first along the wall portion 54 and then along the wall portion 56 as the operating lever is moved from its closed to its open position.

FIGS. 1, 2 and 3 show the fastening device in its fully closed condition. When the device is in this condition the operating lever side flanges 28, 28 and the side walls 40, 40 of the spring cartridge are all nested between and are generally parallel to the base flanges 30, 30. Further, it will be noted that the operating lever side flanges 28, 28 are provided with notches 58, 58 which accommodate the pin 44 when the operating lever is in such closed position. Also the rear ends of the base flanges 30, 30 are provided with openings 60, 60 and the rear ends of the operating lever flanges 28, 28 are provided with openings 62, 62 which openings 60, 60 and 62, 62 register to permit the convenient application of a seal wire for sealing the device in the closed condition. When the device is in the illustrated closed condition the springs 43, 43 by pressing downwardly on the pin 44, urge the spring cartridge 34 and the attached hook member 16 downwardly to exert a resilient closing pressure on the strike. Preferably and as shown the slots 48, 48 are of such a size that the pin 44 does not bottom against the lower or rear ends of the slots when the device is closed with the result that the full spring force is transmitted to the strike. Also the slots 38, 38 in the side walls of the spring cartridge are preferably, and as shown, of such a length that the pin 36 does not bottom against the lower ends thereof when the device is closed with the result that only the spring force and no excessive direct toggle action force is applied to the strike.

To effect opening of the device a raising force is applied to the finger piece 32 to move the operating lever counterclockwise from the position shown in FIGS. 1, 2 and 3, past the position shown in FIG. 4, to the position shown by the full lines of FIG. 5. At this time the hook portion 14 of the member 16 is raised above the bearing surface 12 of the strike. Also at this time the parts of the catch unit are in the relative positions shown in FIG. 6 from which it will be noted that the cylindrical sleeve 46 is held firmly against the eye 45 by the springs 43, 43 with the result that the hook member 16 is frictionally maintained at a fixed angular position relative to the spring cartridge 34. Therefore if the operating lever is now moved toward its closed position, or to the position shown by the broken lines of FIG. 5, the hook portion 14 will be moved clear of the strike surface 12. Accordingly, to open the device the operating lever may be moved from its closed position to its open position and then returned to its closed position without any need for manipulating the hook member and without any danger of the hook member reengaging the strike during the closing movement of the operating lever. When the device is mounted in the vertical position shown in the drawings the operating lever will normally fall by gravity from the open position shown by the full lines of FIG. 5 to or below the position shown by the broken lines of the same figure. This allows the device to be quickly opened by a single upward movement of the operating lever, the frictional restraint between the hook member and the spring cartridge assuring that the hook will not reengage the strike as the operating lever falls back from the fully open position. Even if the fastener is mounted in some position other than vertical the frictional restraint between the hook member and spring cartridge will cause the hook to be moved free of the strike as the operating lever is moved forward and then rearward. The frictional force existing between the hook member and the spring cartridge, when the device is open, is relatively light so when re-closing the device the hook member may be easily moved by finger force relative to the spring cartridge to effect reengagement with the strike. As explained hereinafter the hook member may also be provided with a cam protrusion which cooperates with the pin 36 to move and hold the hook member free of the strike as the operating lever is moved forward. In this case the operating lever need not be moved rearward to effect complete release.

When the device is intentionally released or opened, the action is such that a manual opening force must be applied to the operating lever 26 throughout a large part if not all of its opening range of movement, and unlike other spring loaded catches the operating lever will not snap or jump or exhibit a rapid shock release or rebound through the spring release force, and thereby possibly injure the user, as the lever pivots toward release. Frictional action and directional forces set up in the device slow down or restrain the motion of the operating lever giving the device what may be characterized as a controlled release movement. Part of the means employed for preventing rapid shock release, rebound or jumping of the operating lever includes the slots 48, 48 and pin 44 for holding the lower end of the spring cartridge 34 close to the base portion 24. Another part of the same means includes the slots 38, 38 and the pin 36.

The various forces acting on the parts of the device and the manner in which these forces act to provide the desired controlled movement of the operating lever may be best understood from the illustrations of FIGS. 7, 8 and 9 wherein the various parts of the device are shown schematically. Referirng first to FIG. 7, this figure shows the fastening device in its closed position, and from this figure it will be noted that at this time the pivot pin 36 has acting thereon the force of the spring 43. It will be understood that the force acts substantially longitudinally of the spring cartridge 34 and tends to rotate the operating lever 26 clockwise, or toward its closed position, about the axis of the pin 29. The spring 43 thus serves to hold the operating lever 26 in this closed position and some force must be applied to the rear end thereof to move the same from such position.

Let us assume now that the operating lever is moved from the position shown in FIG. 7 to the position shown in FIG. 8. The pivot pin 36 is now located outwardly or overcenter relative to the pivot pin 29, and it would now be expected that the spring force acting on the pin 36 would cause the operating lever 26 to move rapidly or jump toward its fully opened position. This would be the case were it not for the fact that the rear end of the spring cartridge 34 is held close to the base of the catch unit and prevented from moving outwardly with the operating lever. In FIG. 7 the pin 36 has been moved by the lever 26 into the closed or holding position of the catch, thereby compressing the springs to obtain the designed spring closing force. This spring force tends to hold the straight alignment of the spring cartridge 36 and link 16 and also normally positions the pin 44 where indicated when the catch is in the closed or holding position. The fulcrum point or strike B and pins 42, 36 and 44 and links 16 and 34 are thus established in approximate alignment through the force of the springs. Raising or counterclockwise movement of the lever 26 now raises the pin 36 in its arc motion. This also exerts an upward force on pin 44 which however is limited in its upward motion by the walls of the slot 48. The fulcrum point B and its pin 44 are also at a maximum distance apart when the fastener is closed as shown in FIG. 7. Moving the lever 26 upward to raise pin 36 reduces the distance between the fulcrum point B and the pin 44 against the established spring force bearing on pin 36. As the lever 26 is raised against the aforesaid spring force frictional or other force is also established on the pin 44 by its relative movement against the outer wall of the slot 48. By sloping the wall as at 54 the extent of the holding force on the pin 44 is limited in the area of the initial movement of the lever 26 and pin 44 from the closed position. Movement of lever and pin raise 44 is also favored by sloping wall 54 as it allows the pin 44 to raise relative to the base to further reduce the opposing force.

As the lever 26 carries the pin 36 in its arc and as the release motion progresses the opposing forces change and it becomes desirable to adjust the forward path of travel of the pin 44 by angling the wall of the slot 48 upward and inward as at 56 thus balancing the forces and controlling the force exerted by the pin 44 against wall 56.

When the pin 36 is carried upward in its arc against the aforesaid established spring force, the lever 16 supported at B and by the pin 42 alters its angular relation to the cartridge 34. When the pin 36 is in the lower or initial area of travel from the engaged or closed position of the fastener the previously described forces and confined movement of parts prevent the spring force from advancing the pin 36 in the slot 38 in the spring cartridge. In the movement of the pin 36 as just described, however, a force between the pin 36 and the upper wall of the slot 46 is also brought about through the manual upward force on the pin 36 which results when lever is moved toward release. As the angular relation between the link 16 and the cartridge 34 changes as opening movement of the lever 26 progresses toward the release of the catch, the spring force and extent of force exerted by the pin 36 against the upper wall of the slot 46 change also, and as a result of this the forward urging pressure of the springs on the pin 36 overcomes the opposing forces and the pin 36 is urged to a forward location in the slot 38.

The lever 26 then carries the pin 36 further along in its arc, with said pin resting in the forward portion of the slot 38 toward full release to free the hook end of the link 16 from the strike.

The actual forces involved may best be understood by reference to FIGS. 8 and 9. Considering FIG. 8, it will be noted that the hook member 16 exerts a force $Fa$ on the spring cartridge 34 through the pin 42, which force $Fa$ may be broken up into a component $Fa1$ acting parallel to the longitudinal axis of the spring cartridge and another component $Fa2$ acting normal to the longitudinal axis of the spring cartridge. The normal component $Fa2$ tends to rotate the spring cartridge 34 counter-clockwise about the axis of the pin 36 and thereby urges the pin 44 carried by the rear end of the spring cartridge against the outer wall of the slot 48 to produce a force $Fb$ acting on the pin 44. The force $Fb$ may also be resolved into a component $Fb1$ acting parallel to the longitudinal axis of the spring cartridge and a component $Fb2$ acting normal to such axis. Also acting on the pin 44 is the force $Fs$ of the spring 43. The two component forces $Fa2$ and $Fb2$ acting normal to the longitudinal axis of the spring cartridge are opposed by a force $Fc$ exerted by the pin 36 on the spring cartridge. The directions of the forces $Fc$ and $Fb$ depend on the shape of the slots 38 and 48 respectively and these slots may be variously shaped to vary the opening characteristics of the operating lever. In the device illustrated in FIG. 8, however, the slot 38 is considered to extend longitudinally of the spring cartridge 34 so that the force $Fc$ acts normally thereto, and the pin 44 is considered to be in engagement with a portion of the slot 48 which is parallel with the base 24 so that the force $Fb$ acts normal to said base.

Considering now FIG. 9 the force $Fc$ exerted by the pin 36 on the spring cartridge 34 is opposed by an equal and opposite force $Fd$ exerted by the spring cartridge on the pin 36. Also exerted on the pin 36 is the spring force $Fs$. The spring force $Fs$ may be resolved in the components $Fs1$ and $Fs2$ and the force $Fd$ into components $Fd1$ and $Fd2$. From this it will be seen that the component $Fd2$ acts oppositely to the component $Fs2$ and thereby acts against the opening tendency of the component force $Fs2$ to accordingly reduce or overcome the opening action of the spring. In order to obtain the smoothest operation of the operating lever 26 the component force $Fs2$ should be substantially equal to the force $Fd2$ throughout the entire opening movement of the operating lever 26. It can be shown, however, that if the slots 38, 38 are designed with their outer side walls parallel to the longitudinal axis of the spring cartridge 34 and the slots 48, 48 are designed with their outer side walls parallel to the base 24, the component force $Fd2$, during the opening movement of the lever 26, will initially be greater than the component force $Fs2$ and will thereafter become less than the force $Fs2$ as the operating lever approaches the full open position. This situation can be overcome by properly shaping the slots, as for example providing the slot 48 with a shape somewhat as shown in FIGS. 2, 3, 4 and 5 wherein during the opening movement of the lever 26 the pin 44 first rides against the surfaces 54, 54 which are inclined upwardly and outwardly relative to the base 24 and then rides against the surfaces 56, 56 which are inclined upwardly and inwardly relative to the base 24. When the pin 44 is in engagement with the wall surfaces 54, 54 the force $Fb$ is inclined forwardly or to the left from the position shown in FIG. 8 with the result that the component force $Fd2$ is reduced, whereas when the pin 44 is in engagement with the inclined surfaces 56, 56 the force $Fb$ is inclined rearwardly to the position shown in FIG. 8 with the result that the force $Fd2$ is increased. Also the force relationship may be varied by providing the slots 38, 38 with inclined outer side walls as shown hereinafter in the construction of FIGS. 10, 11 and 12. Inclining these walls downwardly and inwardly as shown in these figures increases the component force $Fc2$. Inclining the walls in the opposite direction has the opposite effect. In addition to the forces illustrated in FIGS. 8 and 9 there are also present friction forces between the pin 36 and the cartridge 34 and between the pin 44 and the base which friction forces also aid in controlling the movement of the operating lever 26. The static friction forces produced have been found to be generally sufficient to cause the operating lever to hold various positions to which it is moved with a result that a manual force must be applied to the operating lever to cause it to be moved from such a position in either the opening or closing directions.

Before leaving FIGS. 7 and 8 it should be noted that in these figures the left hand end of the link 16 has been shown for convenience to be connected to the strike B by a hinge joint whereby the link is at all times connected to the strike and panel 22 even though free to pivot relative thereto. In this case the hinge connection means comprises a hinge pin 91 carried by two ears 93, 93, only one of which is shown in FIGS. 7 and 8, and loosely received by an opening in the link 16. In all of the constructions shown by the drawings the hook member is not directly hinged to the strike but instead is free to move out of engagement therewith as the operating lever reaches the open position. Nevertheless, there may be some instances in which it is desirable to provide a direct hinge joint as shown in FIGS. 7 and 8. For example, where a cover is provided for a four-sided box it may be desirable to provide fasteners of the type shown in FIG. 1 on three sides of the box and fasteners with a hinged connection such as shown in FIG. 7 on the other side of the box. All fasteners may then be used to draw and hold the cover to the box. On opening the box all fasteners are opened and those on the one side of the box serve as hinges allowing the cover to be pivotally raised relative to the box while nevertheless keeping the cover connected therewith and thereby safeguarding against loss of the cover.

In accordance with another aspect of the invention the strike B and catch unit A are designed to facilitate the alignment of the strike with the catch unit as the two separate panels carrying the same are moved together and are also designed to restrain movement of the strike in any direction relative to the catch unit after the device is closed. This is accomplished by guide means on the strike and other guide means on the catch unit, which two guide means cooperate to align the strike in both directions in a horizontal plane relative to the catch unit as the two parts are moved together. In the illustrated case the strike includes a flat base portion 64, which contains the openings 18, 18, and the guide means on the strike include symmetrically arranged portions 66, 66 which are raised or bulged outwardly from the flat portion 64. Between the bulged portions 66, 66 and integral therewith is an upwardly and outwardly inclined flat portion 68 which at its upper end defines the straight bearing surface 12. Above the surface 12 the strike is provided with an opening 70 to receive the hook portion 14 and to permit engagement of the latter with the surface 12.

The lower parts of the two bulged portions 66, 66 are bent downwardly and inwardly toward the flat base portion 64 to define downwardly and inwardly inclined guide surfaces 72, 72. That is, the surfaces 72, 72 are inclined relative to the plane of the base portion 64. Adjacent each of said guide surfaces 72, 72 the strike B further includes a downwardly extending tongue 74 which provides a guide surface 76 inclined relative to a plane normal to the plane of the base portion 64. As shown in FIGS. 2 and 5 each tongue 74 is bent so as to be offset outwardly, or slightly to the right as viewed in these figures, from the plane of the base portion 64. Further, the lower end of each tongue is bent outwardly to produce an upwardly and inwardly inclined bearing surface 78.

For cooperation with the guide surfaces 72, 72 of the strike, the catch unit A is provided with upwardly and outwardly inclined guide surfaces 80, 80 which are defined by the upper ends of the base flanges 30, 30. Adjacent each base flange 30, 30 the base 24 of the catch unit is bulged outwardly to provide portions 82, 82 which are adapted to lie in substantially the same plane as the tongues 74, 74 of the strike and which are provided with inclined guide surfaces 84, 84 complimentary to the guide surfaces 76, 76 of the strike. The length of the tongues 74, 74 on the strike B is such that when the strike and catch unit are in the relative positions shown in the drawings the inclined surfaces 78, 78 of the tongues will overlap a small part of the base portion 24 of the catch unit or at least a part of the lower panel 20. As the panel 22 is brought into closed relationship with the panel 20 the tongues 74, 74 may also engage the panel 20 to guide the parts into proper relationship. The offsetting of the tongues from the plane of the base of its strike normally prevents the tongues from scuffing the panel 20.

Referring now to FIGS. 1 and 2 it can be seen how the various guide surfaces function to properly align the strike with the catch unit as the same are brought into close relationship as by movement of the panel 22 toward the panel 20. Assume, for example, that the panel 22 is located some distance above the panel 20 and is also displaced a slight distance to the right or left of the position shown in FIG. 2. As the panel 22 is moved downwardly toward the panel 20 engagement of the surfaces 72, 72 with the surfaces 80, 80 or of the surfaces 86, 86 with the base portion 24 will cause the panel 22 and the attached strike to be shifted or cammed to the right or left, or in a direction normal to the plane of the base portion 64 to bring the same into the properly aligned position shown in FIG. 2. Also assume, for example, that when the panel 22 is raised from the panel 20 the strike B is shifted to the right or left of the position shown in FIG. 1. Thereafter as the panel 22 is brought downwardly toward the panel 20 the engagement of the inclined guide surfaces 76, 76 with the complimentary guide surfaces 84, 84 will cause the strike to be shifted or cammed to the right or left as viewed in FIG. 1, or in a direction parallel to the plane of base 24, to bring the same into the properly aligned position shown in FIG. 1. After the parts are brought to the positions shown in FIGS. 1 and 2 it will be noted that the overlapping of the guide surfaces 72, 72 with the guide surfaces 80, 80 together with the overlapping of the surfaces 86, 86 with the base 24 of the catch unit prevents the strike and catch unit from moving relative to each other in the direction normal to the plane of the base portions 24 and 64. Likewise, the overlapping of the inclined guide surfaces 76, 76 with the guide surfaces 84, 84 prevents relative movement of the strike and catch unit in the horizontal direction parallel to the plane of the base portions. At the same time the engagement of the hook member 16 with the strike B prevents the strike from moving upwardly relative to the catch unit and therefore the catch unit and strike are prevented from moving in any direction relative to the other.

Referring now to FIGS. 10, 11 and 12, these figures show a fastening device generally similar to that shown in FIGS. 1 to 6, inclusive, and representing another embodiment of the present invention. In the fastening device of FIGS. 10, 11 and 12 parts which are generally similar to the corresponding parts of the fastening device of FIGS. 1 to 6 have been given corresponding reference numerals and will not be described again in detail. As mentioned previously, the slots 38, 38 in the side walls of the spring cartridge 34 may be inclined rather than parallel to the longitudinal axis of the spring cartridge, and FIGS. 10, 11 and 12 show the slots 38, 38 so inclined. In this case the direction of the inclination is such that the force $Fc2$ acting on the pin 36, and tending to oppose movement of the operating lever 26 toward its open position, is increased in comparison to the similar force produced by the FIGS. 1 to 6 device. Also, as mentioned previously, the cylindrical sleeve 46 is not essential and in the device of FIGS. 10, 11 and 12 this part is omitted with the slots 38, 38 being so disposed or of such length that the pin 36, when the operating lever 26 is in its fully opened or forward position, will be moved into direct engagement with the outer surface of the eye 45 to frictionally maintain the angular relationship between the hook member 16 and the spring cartridge 34. The hook portion 14 of the hook member is therefore moved clear of the bearing surface 12 of the strike B as the operating lever 26 is returned from its fully opened position toward its closed position.

Also included in the fastening device of FIGS. 10, 11, 12 and 13 is a means for releasably holding the hook member 16 in a folded position relative to the spring cartridge 34 when the operating lever 26 is moved to its closed position without the hook member 16 being engaged with the strike B. As shown in FIG. 12 this means constitutes a raised surface or protuberance on the outer surface of the eye 45, such as provided by the rounded head 90 of a small pin 92 inserted through registering openings in the eye 45 and the pivot pin 42 and fixed relative to the latter two parts. As shown in FIG. 12 the location of the rounded head 90 is such that when the hook member 16 is moved to the illustrated folded position the head is located to one side of the pivot pin 36 which in turn is frictionally held against the outer surface of the eye by the springs 43, 43. The pivot pin 36 in cooperation with the rounded head 90 thus holds the hook member 16 in its folded position. When the hook member 16 is to be moved counterclockwise from the folded position shown in FIG. 12 the rounded head 90 acts as a cam for moving the pivot pin 36 rearwardly so that by applying some manual force to the hook member 16 the latter may be swung from the illustrated folded position for reengagement with the strike B.

Also included in the device of FIGS. 10, 11, 12 and 13 is another cam protuberance on the outer surface of the eye 45 which cooperates with the pin 36 to move the hook member 16 free of the strike as the operating lever moves toward its released position. As shown in FIGS. 12 and 13 this protuberance includes a rounded head 95 on the opposite end of the pin 92 from the head 90, but this manner of providing the protuberance is not essential and it could be otherwise formed as, for example, by the head of a second pin similar to the pin 92.

From FIG. 13 it will be noted that the protuberance or rounded head 95 is so located as to be engaged by the pin 36 as the latter pin moves to the forward end of the slot 38 during the opening movement of the operating lever 26, and the engagement is further such that the pin 36 as urged against the head 95 by the spring force tends to rotate or cam the hook member 16 in such a direction as to move the same away from engaging relation with the strike. In FIG. 13 the solid lines show the position of the hook member at the instant the hook is moved just slightly above the strike edge 12. The broken lines illustrate the position the hook member thereafter assumes as a result of the camming action between the pin 36 and the rounded head 95. It will therefore be noted that the hook member is moved free of the strike edge 12 without any need for the operating lever being returned toward its closed position. To close the fastener finger pressure is applied to the hook member to move the head 95 relative to the pin 36 and against the camming action and to bring the hook into reengagement with the strike.

Another feature included in the fastening device of FIGS. 10, 11, 12 and 13 is a detent means for releasably holding the operating lever 26 in its closed position when the hook member 16 is out of engagement with the bearing surface 12 of the strike. As illustrated, this means includes a notch 96 formed in each side flange 28 of the operating lever 26. The two notches 96, 96 are generally similar to the notches 58, 58 of the device shown in FIGS. 1 to 6 except that the notches 96, 96 are so shaped that the flanges 28, 28 engage the pin 44 carried by the lower end of the spring cartridge 34 in such a manner as to releasably hold the operating lever in its closed position. As shown best in FIG. 11, the notch 96 in each side flange 28 has a rear generally forwardly facing wall which is shaped to define a rearwardly extending recess 98 formed in part by a forwardly and inwardly inclined cam surface 100. Intersecting the cam surface 100 is a forwardly and upwardly inclined cam surface 102. The operation is such that when the operating lever 26 is moved from the partially open position shown in FIG. 11 toward the closed position shown in FIG. 10 the inclined cam surfaces 102, 102 of the two said in flanges 28, 28 engage the pin 44 and cam the latter forwardly to allow it to pass over the points defined by the intersection of the surfaces 100, 100 and 102, 102. Thereafter the springs 43, 43 urge the pin 44 rearwardly into the recesses 98, 98 and engagement of the pin 44 with the inclined surfaces 100, 100 holds the operating lever 26 in its closed position. If a lifting force is now applied to the lever 26 for the purpose of moving the same toward its open position, the inclined cam surfaces 100, 100 move the pivot pin 44 forwardly to disengage the pin 44 from the recesses 98, 98 and to thereby unlock the operating lever 26 from the pivot pin 44. In FIG. 12 the operating lever is shown in its closed position and it is held in such position by the engagement of the recesses 98, 98 with the pivot pin 44 despite the fact that the hook member 16 is not in engagement with the strike B.

If desired, the fastening device shown by FIGS. 1 to 6 also may be slightly modified to provide for a control lever on the rear end of the operating lever 26 to facilitate operation of the device. A construction employing a control lever is shown in FIGS. 14, 15, 16 and 17. Referring to these figures the illustrated catch is generally similar to that shown in FIGS. 1 to 6, and like the reference numerals have been applied to generally similar parts. Referring to FIGS. 14, 15, 16 and 17 the fastening device therein illustrated includes an operating lever 26' which in place of the finger piece 32 has pivotally connected to the rear end thereof a control lever 104. The latter control lever has two transversely spaced and forwardly extending side flanges 106, 106 which are disposed adjacent the side flanges 28', 28' of the operating lever and are pivotally secured thereto by a pivot pin 108. At its forward end each side flange 106 is shaped to receive the pin 44 when the operating lever 26 and the control lever 104 are in their closed positions as shown in FIGS. 13 and 14 and to provide a forwardly extending finger 110 which overlies the pin 44. Each of side flanges 28', 28' of the operating lever is provided with a notch 96, similar to that shown in FIG. 11, and including a recess 98 and walls 100 and 102, for engaging the pin 44 to releasably hold the operating lever closed when the hook member 16 is not engaged with the strike.

Referring particularly to FIG. 15, each side flange 106 of the control lever includes a flat inner edge 111 which is so located as to rest flatly against the panel 20 to which the base is attached and to thereby hold the control lever in straight alignments with the operating lever when the operating lever is in its closed position. Also included on each side flange 106 is a stop tab 112 which extends perpendicularly from the associated side flange toward the opposite side flange. Each stop tab 112 projects into and is received by a notch 114 in the associated side flange 28 of the operating lever. The tabs 112, 112 and the notches 114, 114 thus cooperate to limit the pivotal movement of the control lever 104 in both directions relative to the operating lever 26. When the control lever is in the closed position shown in FIG. 15 the stop tabs 112, 112 engage one end of the notches 114, 114 to prevent further rotation of the control lever in the clockwise direction.

To open the device a lifting force is applied to the lower end or finger piece portion 116 of the control link. This causes the control lever to pivot relative to the operating lever and causes the fingers 110, 110 of the control link to bear against the pin 44 and move the operating lever relative to the base about the axis of the pivot pins 29, 29. As a result of this movement of the control lever, and after the control lever is moved so far as permitted by the tabs 112, 112 and notches 114, 114, the parts assume the relative positions shown in FIG. 17 whereas the control lever finger piece 116 is displaced some distance from the base and capable of being more conveniently grasped for use in moving the operating lever to its fully open position. When the device is to be closed, downward pressure is applied to the control lever finger piece. The control lever assumes a straight alignment with the operating lever due to the engagement of the tabs 112, 112 with the lower or inner ends of the notches 114, 114, and therefore the downward pressure is transmitted through the tabs 112, 112 to the operating lever to cause the latter to be pivoted to its closed position. After the operating lever reaches its closed position it retains such position either by the action of the spring forces, in the event the hook member 16 is engaged with the strike, or by the action of the hook shaped recesses 96, 96 releasably engaging the pin 14, in the event the hook member 16 is not engaged with the strike. The control member is also held in proper straight alignment with the operating lever by the engagement of the flat edges 111, 111 with the surface of the panel 20.

The invention claimed is:

1. In a fastening device for releasably securing together two separable panels or the like, the combination comprising a base adapted for attachment to one of said panels, an operating lever connected with said base for movement about a transverse lever axis fixed relative to said base between open and closed positions, a first link connected to said operating lever for movement relative thereto about a first transverse link axis movable relative to said base and spaced from said lever axis, a second link having at one end a means providing a bearing surface for engagement with a cooperating bearing surface on the other of said panels and pivotally connected at the opposite end with one end of said first link for movement relative thereto about a second transverse link axis spaced from said first link axis, spring means included in one of the said links and arranged to resist any increase in the distance between said first and second link axes, and means fixed relative to said base and engageable with the other end of said first link for restraining said other end of said first link to movement relative to said base in a direction generally toward or away from said transverse lever axis.

2. In a fastening device for releasably securing together two separable panels or the like, the combination comprising a base adapted for attachment to one of said panels, an operating lever connected with said base for movement about a transverse lever axis fixed relative to said base between open and closed positions, a first link connected to said operating lever for movement relative thereto about a first transverse link axis movable relative to said base and spaced from said lever axis, a second link having at one end a means providing a bearing surface for engagement with a cooperating bearing surface on the other of said panels and pivotally connected at the opposite end with one end of said first link for movement relative thereto about a second transverse link axis spaced from said first link axis, spring means included in one of the said links and arranged to resist any increase in the distance between said first and second link axes, and means for holding the other end of said first link close to said base as said operating lever is moved between its open and closed positions, said means for holding the other end of the first link close to the base comprising means fixed relative to said base and defining two generally longitudinally extending slots located on opposite sides of said link and a transverse pin carried by said other end of said first link and having laterally outwardly extending portions received by said slots.

3. The combination defined in claim 2 further characterized by each of said slots having an outer wall surface along which said pin slides as said operating lever is moved between its open and closed positions, said outer wall surface including one inclined portion facing generally forwardly and another inclined portion facing generally rearwardly.

4. The combination defined in claim 2 further characterized by said operating lever including a side flange having a notch with a rearwardly extending recess for engaging and receiving at least a portion of said transverse pin to releasably hold said operating lever in its closed position when said second link is disengaged from said bearing surface on said other panel.

5. The combination as defined in claim 1 further characterized by means providing a hinge connection between said one end of said second link and the other of said panels.

6. In a fastening device for releasably securing together two separable panels or the like, the combination comprising a strike adapted for attachment to one of said panels, a base adapted for attachment to the other of said panels, an operating lever connected with said base for movement about a transverse lever axis fixed relative to said base between open and closed positions, a first link connected to said operating lever for movement relative thereto about a first transverse link axis fixed relative to said operating lever at a location spaced from said lever axis and movable relative to said first link in a direction generally longitudinally thereof, a second link having a strike engageable portion at one end and pivotally connected at the opposite end with one end of said link for movement relative thereto about a second transverse link axis spaced from said first link axis and fixed relative to said first link, spring means included in one of the said links and arranged to resist any increase in the distance between said first and second link axes, and means fixed relative to said base and engageable with the other end of said first link for restraining said other end of said first link to movement relative to said base in a direction generally toward or away from said transverse lever axis.

7. The combination defined in claim 6 further characterized by means for frictionally maintaining the angular relationship between said first and second links when said operating lever is moved to its open position and as the operating lever is returned some distance toward its closed position whereby said second link is prevented from inadvertently reengaging said strike after said operating lever is moved to its open position.

8. In a fastening device for releasably securing together two separable panels or the like, the combination comprising a strike adapted for attachment to one of said panels, a base adapted for attachment to the other of said panels, an operating lever connected with said base for movement about a transverse lever axis fixed relative to said base between open and closed positions, a first link connected to said operating lever for movement relative thereto about a first transverse link axis fixed relative to said operating lever at a location spaced from said lever axis and movable relative to said first link in a direction generally longitudinally thereof, a second link having a strike engageable portion at one end and pivotally connected at the opposite end with one end of said first link for movement relative thereto about a second transverse link axis spaced from said first link axis and fixed relative to said first link, spring means included in one of the said links and arranged to resist any increase in the distance between said first and second link axes, means for holding the other end of said first link close to said base as said operating lever is moved between its open and closed positions, said first and second link axes and said lever axis being so arranged that said strike engageable portion on said second link is moved so as to exert closing pressure on said strike as said operating lever is moved from its open to its closed position, and cam means between said first and second link for moving said second link relative to said first link and to thereby bring said strike engageable portion of said second link out of engaging relationship with said strike as said operating lever is moved from its closed position to its open position.

9. In a fastening device for releasably securing together two separable panels or the like, the combination comprising a strike adapted for attachment to one of said panels, a base adapted for attachment to the other of said panels, an operating lever connected with said base for movement about a transverse lever axis fixed relative to said base between open and closed positions, a first link connected to said operating lever for movement relative thereto about a first transverse link axis fixed relative to said operating lever at a location spaced from said lever axis and movable relative to said first link in a direction generally longitudinally thereof, a second link having a strike engageable portion at one end and pivotally connected at the opposite end with one end of said first link for movement relative thereto about a second transverse link axis spaced from said first link axis and fixed relative to said first link, spring means included in one of the said links and arranged to resist any increase in the distance between said first and second link axes, means for holding the other end of said first link close to said base as said operating lever is moved between its open and closed positions, and cooperating guide means on said strike and on said base for aligning said strike with said base as said operating lever is moved from its open to its closed position with said second link engaged with said strike and for thereafter restraining said strike against movement relative to said base.

10. The combination defined in claim 9 further characterized by said strike having a generally flat base portion and an outwardly and forwardly inclined portion terminating in a generally forwardly facing bearing surface adapted for engagement with said second link, said guide means on said strike including two outwardly bulged portions located on opposite sides of said inclined portions and each of which bulged portions at its rear end is shaped to define a guide surface inclined relative to the plane of said flat base portion, and said guide means on said base including two transversely spaced base flanges each having on its forward end a complementally inclined guide surface adapted to engage the guide surface on a respective one of said bulged portions.

11. The combination defined in claim 9 further characterized by said guide means on said strike including two guide surfaces and said guide means on said base including two guide surfaces on said base adapted to mate with said two guide surfaces on said strike so as to guide said strike into proper lateral alignment relative to said base and to prevent said strike from moving laterally relative to said base after said operating lever is moved to its closed position.

12. The combination defined in claim 9 further characterized by said guide means on said strike including two transversely spaced rearwardly extending tongues each having a rear end portion defining a guide surface inclined relative to the plane of the base and adapted to overlie a corresponding portion of said other panel.

13. In a fastening device for releasably securing together two separable panels or the like, the combination comprising a strike adapted for attachment to one of said panels and defining a generally forwardly facing bearing surface, a base adapted for attachment to the other of said panels, an operating lever connected with said base for movement about a transverse lever axis fixed relative to said base and between a generally forwardly extending open position and a generally rearwardly extending closed position, said lever having two transversely spaced side flanges and a transverse lever part fixed to said side flanges and extending transversely therebetween at a location spaced from said lever axis, a spring cartridge located between said side flanges and having two side walls provided with generally longitudinally elongated slots through which said transverse lever part extends, said slots being located intermediate the ends of said spring cartridge, a link pivotally connected at one end with said spring cartridge for movement relative thereto about a transverse link axis spaced forwardly of said lever part and fixed relative to said spring cartridge, said link having a forward portion defining a generally rearwardly facing bearing surface engageable with said bearing surface of said strike, spring means in said spring cartridge arranged to urge said spring cartridge rearwardly relative to said lever part and to resist any increase in the distance between said lever part and said link axis, and means for holding the rear end of said spring cartridge close to said base as said operating lever is moved between its open and closed positions, said lever axis and said lever member and said link axis being so related that as said operating lever is moved from its open to its closed position with said link engaged with said strike closing pressure is exerted on said strike by said link.

14. The combination as defined in claim 13 further characterized by said means for holding the rear end of said spring cartridge close to the base comprising means fixed relative to said base and defining two generally longitudinally extending slots located on opposite sides of said link and a transverse pin carried by said spring cartridge having laterally outwardly extending portions received by said latter slots.

15. The combination as defined in claim 14 further characterized by each of said latter slots having an outer wall surface along which said pin slides as said operating lever is moved between its open and closed positions, said outer wall surface including one inclined portion facing generally forwardly and another inclined portion facing generally rearwardly.

16. The combination as defined in claim 14 further characterized by said operating lever including a side flange having a notch with a rearwardly extending recess for engaging and receiving at least a portion of said transverse pin when said link is disengaged from said strike and said operating lever is in said closed position so as to releasably hold said operating lever in said latter position.

17. The combination defined in claim 14 further characterized by a control lever pivotally connected to the rear end of said operating lever for movement relative thereto about a transverse pivot axis between an aligned and a tipped position relative to said operating lever, said control lever including a rearwardly extending finger piece and two side flanges, each of said side flanges including a finger which extends forwardly of said latter pivot axis and overlie said spring cartridge pin when said operating lever is in its closed position and said control lever in its tipped position, whereby said fingers are engageable with said latter pin so as to move said operating lever relative to said base as said control lever is moved from its aligned to its tipped position.

18. The combination as defined in claim 14 further characterized by said slots in said walls of said spring cartridge being inclined relative to the longitudinal axis of said spring cartridge.

19. The combination defined in claim 14 further characterized by means for maintaining the angular relationship between said spring cartridge and said link after said operating lever is moved to its open position whereby said bearing surface of said link is prevented from inadvertently reengaging said bearing surface of said strike after said operating lever is moved to its open position.

20. The combination defined in claim 19 further characterized by said means for maintaining the angular relationship between said spring cartridge and said link comprising means defining a generally rounded outer surface on the rear end of said link and which surface is arranged to be engaged by said transverse lever part when said part is located in the forward portion of said slots in said walls of said spring cartridge.

21. The combination defined in claim 19 further characterized by said means for maintaining the angular relationship between said spring cartridge and said link including a cam protuberance on the rear end of said link which cam protuberance is so located as to be engaged by said transverse lever part as said part moves to the forward portion of said slots in said walls of said spring cartridge during the opening movement of said operating lever, said location of said cam protuberance further being such that the engagement of said lever part therewith tends to rotate said link relative to said spring cartridge and in such a direction as to move said link away from said strike.

22. The combination defined in claim 14 further characterized by said slots in said side walls of said spring cartridge being so arranged that when said operating lever is in its open position said transverse lever part is held by said spring means against the rear end of said link to frictionally maintain the angular relationship between said link and said spring cartridge.

23. The combination defined in claim 22 further characterized by said link at its rear end having a rounded outer surface generally concentric with said link axis, and means defining a protuberance on said latter surface which protuberance is so located as to be engageable with said transverse lever part to releasably hold said link in a rearwardly folded position relative to said spring cartridge.

24. The combination defined in claim 23 further characterized by means defining a cam protuberance on said latter surface which cam protuberance is so located as to be engageable with said transverse lever part to move said link away from said strike and thereafter maintain the angular relationship between said link and said spring cartridge as said operating lever is moved to its open position.

25. In a fastening device for releasably securing together two separable panels or the like, the combination comprising a strike adapted for attachment to one of said panels and defining a generally forwardly facing bearing surface, a base adapted for attachment to the other of said panels and including a pair of transversely spaced flanges, an operating lever located between said side flanges and connected therewith for movement about a transverse lever axis fixed relative to said base between a generally upwardly extending open position and a generally downwardly extending closed position, said lever having two transversely spaced side flanges and a first pin fixed to said side flanges and extending transversely therebetween at a location spaced from said lever axis, a spring cartridge located between said side flanges of said lever and having two side walls provided with generally longitudinally elongated slots through which said first pin extends, said slots being located intermediate the ends of said spring cartridge, a link pivotally connected at one end of said spring cartridge for movement relative thereto about a transverse link axis spaced forwardly of said first pin and fixed relative to said spring cartridge, said link having a forward portion defining a generally rearwardly facing bearing surface engageable with said bearing surface of said strike, spring means in said spring cartridge arranged to urge said spring cartridge rearwardly relative to said first pin and to resist any increase in the distance between said first pin and said link axis, and means for holding the rear end of said spring cartridge close to said base as said operating lever is moved between its open and closed positions, said lever axis and said first pin and said link axis being so related that as said operating lever is moved from its open to its closed position with said link engaged with said strike closing pressure is exerted on said strike.

26. The combination defined in claim 25 further characterized by said means for holding said spring cartridge close to said base comprising a second pin extending transversely through said spring cartridge and having two laterally outwardly extending portions on either side of said spring cartridge, and a generally longitudinally extending slot in the rear end portion of each of said base flanges which slot receives a respective one of said outwardly extending portions of said second pin.

27. The combination defined in claim 26 further characterized by said spring means comprising at least one helical compression spring in said spring cartridge and positioned between said first and second pins so as to tend to urge said pins apart.

28. The combination defined in claim 26 further characterized by said side flanges of said operating lever being provided with notches so shaped as to cause said side flanges to releasably engage said second pin to hold said operating lever in its closed position when said link is disengaged from said strike.

29. In a fastening device for releasably securing together two separable panels or the like, the combination comprising a base adapted for attachment to one of said panels, an operating lever connected with said base for movement about a transverse lever axis fixed relative to said base between open and closed positions, a first link connected to said operating lever for movement relative thereto about a first transverse link axis movable relative to said base and spaced from said lever axis, a second link having at one end a means providing a bearing surface for engagement with a cooperating bearing surface on the other of said panels and pivotally connected at the opposite end with one end of said first link for movement relative thereto about a second transverse link axis spaced from said first link axis, and means fixed relative to said base and engageable with the other end of said first link for restraining said other end of said first link to movement relative to said base in a direction generally toward or away from said transverse lever axis.

30. The combination defined in claim 29 further characterized by said means for holding the other end of said first link close to said base including means on one of said latter two members defining a generally longitudinally extending guide wall and a part on the other of said latter two members which part is engageable with said guide wall to limit movement of said other end of said first link away from said base and is slidable along said wall to permit movement of said other end of said first link longitudinally of said base.

31. The combination defined in claim 30 further characterized by said guide wall having at least a portion thereof inclined relative to the plane of said base.

References Cited in the file of this patent

UNITED STATES PATENTS

| 600,427 | Padmore | Apr. 8, 1948 |
| 2,605,123 | Claud-Mantle | July 29, 1952 |
| 3,026,133 | Swanson | Mar. 20, 1962 |
| 3,034,817 | Willis | May 15, 1962 |